(12) United States Patent
Bravo

(10) Patent No.: US 8,827,541 B2
(45) Date of Patent: Sep. 9, 2014

(54) CYLINDRICAL TANK FOR THE THERMAL TREATMENT OF A FOOD MIXTURE IN GENERAL AND MACHINE FOR THE PRODUCTION OF FOOD MIXTURES EQUIPPED WITH THIS CYLINDRICAL TANK

(75) Inventor: Genesio Bravo, Alte Ceccato-Vicenza (IT)

(73) Assignee: G.S.G. S.R.L., Vicenza (IT)

( * ) Notice: Subject to any disclaimer, the term of this patent is extended or adjusted under 35 U.S.C. 154(b) by 151 days.

(21) Appl. No.: 13/264,916

(22) PCT Filed: May 4, 2010

(86) PCT No.: PCT/EP2010/002830
§ 371 (c)(1),
(2), (4) Date: Oct. 17, 2011

(87) PCT Pub. No.: WO2010/130375
PCT Pub. Date: Nov. 18, 2010

(65) Prior Publication Data
US 2012/0057426 A1    Mar. 8, 2012

(30) Foreign Application Priority Data
May 14, 2009    (IT) ............................. MI2009A0837

(51) Int. Cl.
| B01F 15/06 | (2006.01) |
| A23G 3/02 | (2006.01) |
| A21C 1/06 | (2006.01) |
| A21C 1/14 | (2006.01) |
| A23G 9/22 | (2006.01) |
| A23G 9/12 | (2006.01) |

(52) U.S. Cl.
CPC ............... *A21C 1/06* (2013.01); *A23G 3/0226* (2013.01); *A21C 1/146* (2013.01); *A21C 1/1495* (2013.01); *A23G 9/22* (2013.01); *A23G 9/12* (2013.01); *A21C 1/1485* (2013.01)
USPC .......................................... 366/145; 366/144

(58) Field of Classification Search
USPC ........ 366/147, 144, 145; 99/348; 62/342, 332
See application file for complete search history.

(56) References Cited

U.S. PATENT DOCUMENTS

| 4,096,754 | A | * | 6/1978 | Beveridge et al. ........... 73/866.5 |
| 4,463,572 | A | | 8/1984 | Brown, Jr. |
| 4,703,628 | A | * | 11/1987 | Togashi et al. .................. 62/135 |
| 6,761,107 | B2 | * | 7/2004 | Oshita et al. .................. 366/146 |
| 7,047,758 | B2 | * | 5/2006 | Ross ............................. 366/285 |
| 2010/0177802 | A1 | * | 7/2010 | Weyna ......................... 374/208 |

FOREIGN PATENT DOCUMENTS

| EP | 0383206 | 8/1990 |
| EP | 1990085 | 11/2008 |

* cited by examiner

*Primary Examiner* — Tony G Soohoo
*Assistant Examiner* — Anshu Bhatia
(74) *Attorney, Agent, or Firm* — Themis Law

(57) ABSTRACT

The invention relates to a cylindrical tank for the thermal treatment of a food product which includes heating and/or cooling means for the food product, in addition to a mixer housed so as to be revolving in its interior. The tank has a cylindrical mantle, closed by a rear bottom and by a front flange, there also being means for feeding the mentioned product inside the tank. At least one temperature sensor of the food product is also positioned in correspondence with an area situated in the front portion of the mantle, corresponding to the discharge area of the same food product from the tank. The invention also relates to machines which use the above-mentioned tank.

10 Claims, 5 Drawing Sheets

Fig. 6
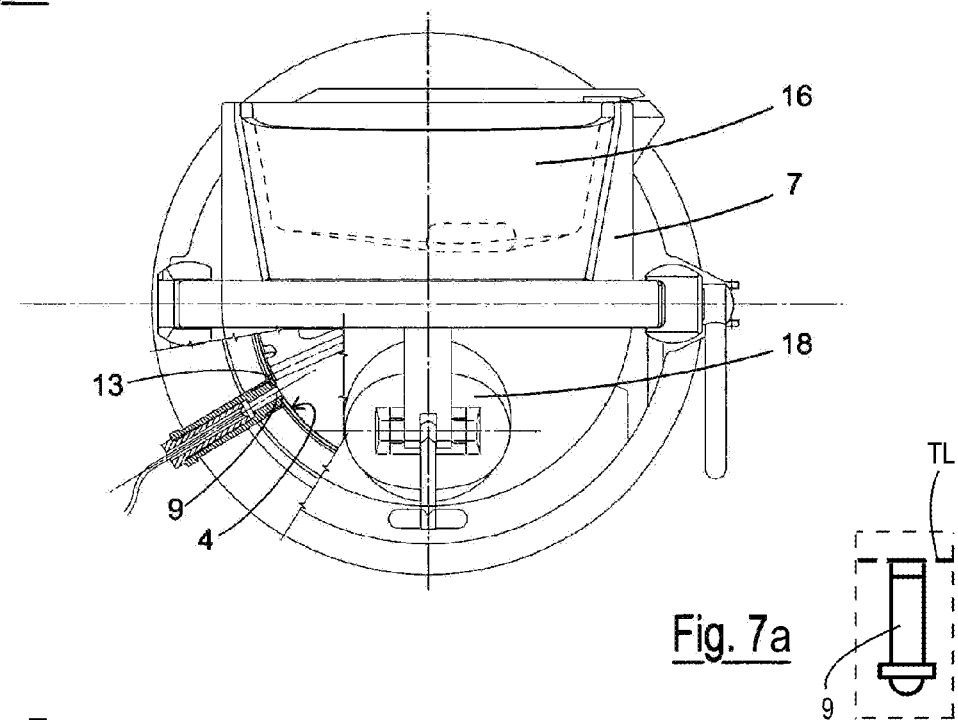
Fig. 7a
Fig. 7
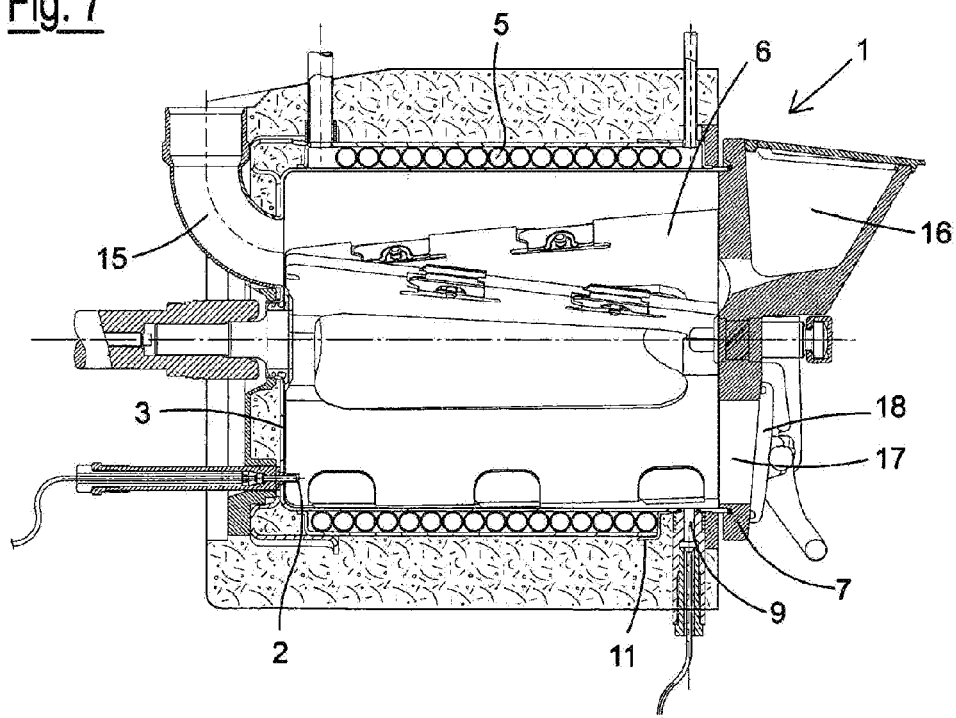

CYLINDRICAL TANK FOR THE THERMAL TREATMENT OF A FOOD MIXTURE IN GENERAL AND MACHINE FOR THE PRODUCTION OF FOOD MIXTURES EQUIPPED WITH THIS CYLINDRICAL TANK

FIELD OF THE INVENTION

The present invention relates to a cylindrical tank suitable for the thermal treatment of food mixtures in general. The invention also relates to machines for the production of food mixtures equipped with said cylindrical tank.

The field of the invention is that relating to machines for the processing of food mixtures (such as ice-cream, pastry cream, chocolate, delicatessen products and similar products) subjected to single or combined thermal treatment (for example cooling in the case of ice-cream, heating and cooling in the case of pastry cream) inside a cylindrical tank (hereinafter called "cylinder") equipped with a suitable axially revolving mixer or stirrer. The temperature control of this mixture is also achieved by means of suitable cooling/heating systems, normally consisting of a coil positioned on the outer surface of this cylinder.

BACKGROUND OF THE INVENTION

In order to determine the temperature value reached by the mixture of food inside a cylindrical tank, the latter comprises a heat sensor, which, for construction reasons, is normally positioned in correspondence with the vertical rear wall forming the bottom of the cylinder, mostly arranged horizontally (with a horizontal axis).

The disadvantage of this known technique is mainly represented by the action of the mixer which, upon rotating, pushes the food mass towards the front area of the cylinder. In this case, and above all in the processing of small quantities of food, the sensor, situated on the outer wall of the cylinder, remains uncovered, i.e. it does not come into contact with the mixture, thus considerably misrepresenting the reading of the heat level reached by the latter.

SUMMARY OF THE INVENTION

The main objective of the present invention is to provide a new cylinder for the thermal treatment of a food mixture which, compared to traditional systems in the field, is equipped with means suitable for ensuring a reading of the actual heat level reached by the mixture.

A further objective of the invention is to provide a cylinder of the mentioned type, capable of detecting the temperature of the food mixture, regardless of its consistency (more or less fluid) and also of the quantity of mixture present inside the cylinder.

Another objective of the invention is to provide a cylinder of the mentioned type whose structure does not represent an obstacle for the normal heat treatment process of the mixture, and at the same time providing the instantaneous real temperature of the same inside the cylinder.

This and other objectives are achieved with the cylindrical tank and machine for the production of food mixtures according to the invention. Preferred embodiments of the invention are described herein.

Compared to traditional machines for the processing of food mixtures, that according to the invention offers the advantage that, thanks to the positioning of the sensor in the front of the cylinder (i.e. the discharge section of the food mixture, the machine guarantees constant contact between the sensor and the food mixture so as to allow the real temperature value to be read, i.e. the temperature effectively reached by the foodstuff inside the cylinder.

This result is also provided in the presence of reduced quantities of food mixture which, in the traditional machines of this type, inevitably leave the sensor positioned on the rear side of the cylinder, uncovered by the product.

Furthermore, the positioning of the sensor in the front section of the cylinder, described above, together with its housing on the ring which closes the coil on the cylinder body, offers the advantage of isolating this sensor with respect to the cooling/heating circuit, otherwise capable of altering its functionality. At the same time, the front positioning of the sensor, described above, does not jeopardize the efficiency of this circuit in the front area of the cylinder.

BRIEF DESCRIPTION OF THE DRAWINGS

These and other objectives, advantages and characteristics are evident from the following description of a preferred embodiment of the cylinder and machine of the invention, illustrated as a non-limiting example, in the figures of the enclosed drawings. In the same:

FIG. 6 illustrates the cylinder of FIG. 3 in a front view and partial cross-section;

FIG. 7 illustrates in a longitudinal section, a variation of the cylinder of the invention, and FIG. 7a illustrates a detail of the embodiment depicted in FIG. 7.

DETAILED DESCRIPTION OF EMBODIMENTS OF THE INVENTION

Figure 1:
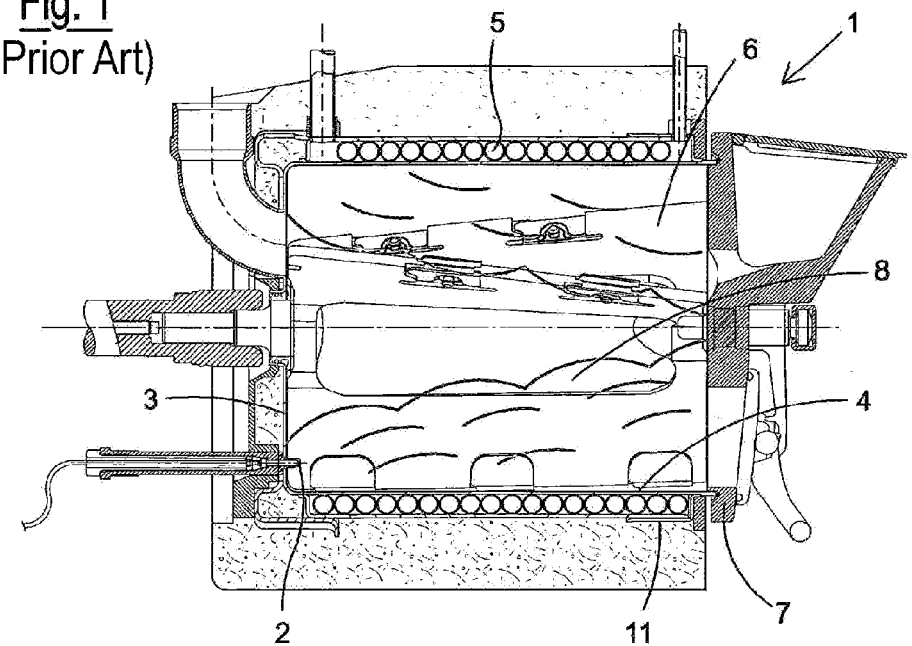
FIGS. 1 and 2 show in a longitudinal section, a cylinder of the known type for the heat treatment of a food mixture, under respectively full and partially empty conditions of the cylinder.

The cylinder of the invention, indicated as a whole with 1 in FIG. 1, is of the traditional type, in which a temperature sensor 2 is situated on the rear wall or bottom 3 of the cylinder 1. The latter is also equipped, on its outer surface, with a coil 5 for the circulation of cooling or heating means. The same cylinder 1 is also completed by a front closing ring 11 on the above-mentioned coil 5, an axially revolving stirrer or internal mixer 6, in addition to a front cover or flange 7.

Figure 2:
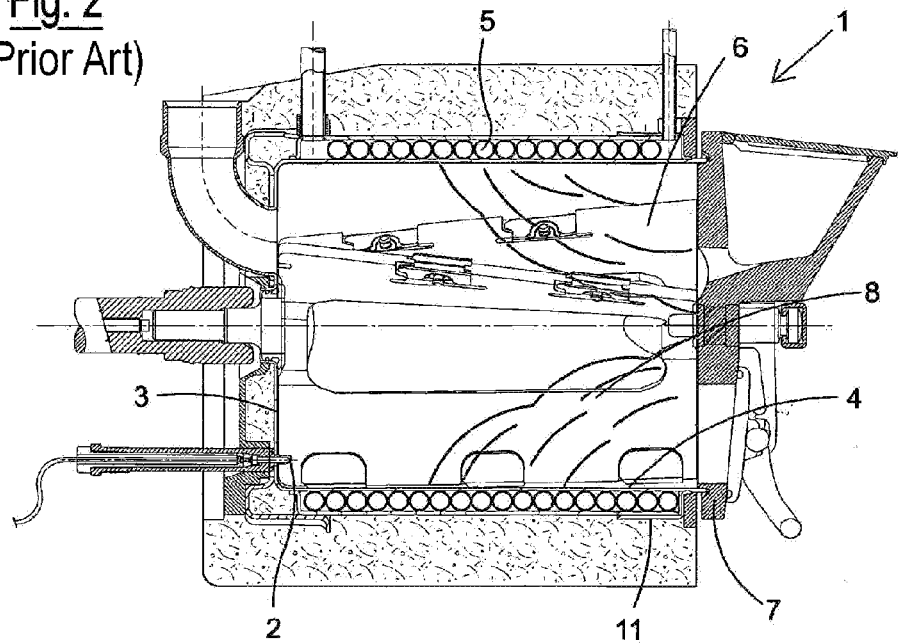

A maximum quantity (normally corresponding to half of the volume of the cylinder 1) of food product 8 is collected in the cylinder 1 of FIG. 1, whereas a small quantity is collected in the cylinder of FIG. 2. As can be seen, in the condition illustrated in FIG. 1, the temperature sensor 2 is immersed in the foodstuff 8, whereas in that illustrated in FIG. 2, the mentioned sensor is completely uncovered, consequently misrepresenting the temperature revealed by the same (as it is the temperature of the air and not the temperature of the food treated in the cylinder 1). Consequently, the above foodstuff at the outlet of the cylinder of FIG. 2 is not in the final processing conditions corresponding to those desired for its consumption (stability, creamy consistency, spreadability, etc.).

Figure 3:
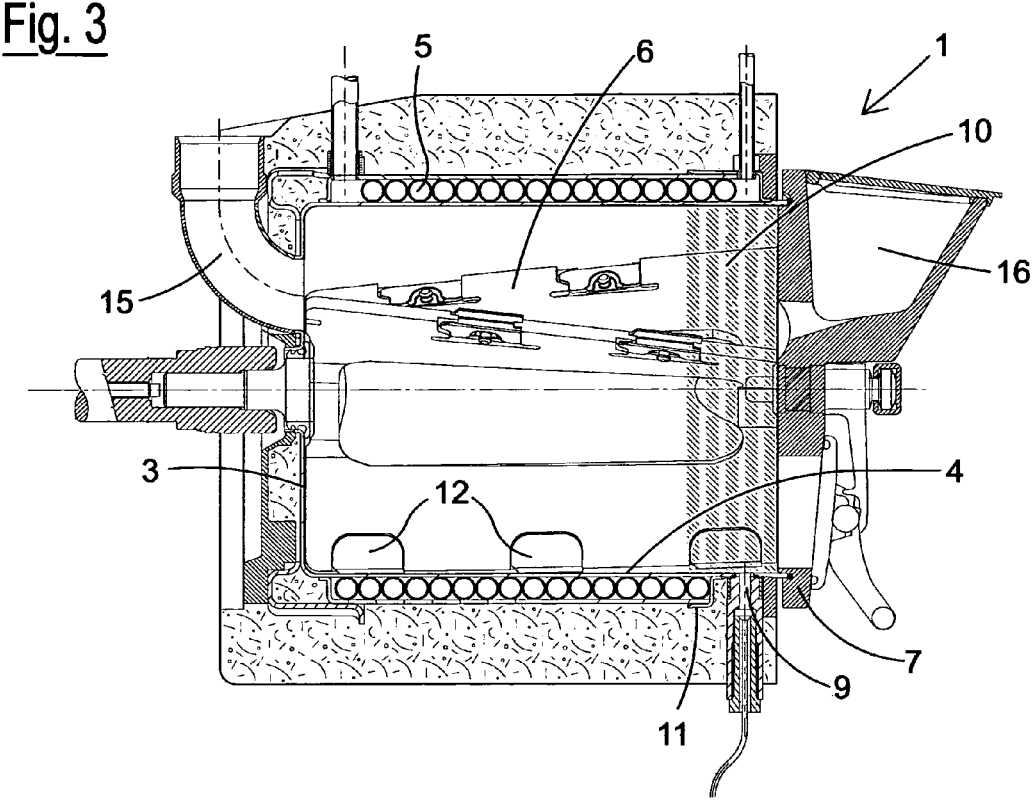
FIG. 3 illustrates, in a longitudinal section, a first embodiment of the cylinder according to the invention.

In order to overcome this drawback, the cylinder of the invention, as shown in FIG. 3, comprises a temperature sensor 9 which is typically positioned in the front of the same cylinder 1. In particular, the above sensor 9 is situated in correspondence with an area 10 of the mantle 4 of the cylinder 1, about 10 cm. wide, positioned in the front portion of the latter, starting from outermost edge of the cylinder, i.e. in correspondence with or close to the discharge flange 7 of the finished product from the cylinder 1 itself The positioning of this sensor 9 close to the area 10 of the cylinder 1, occupied by the spires of the coil 5, could jeopardize the delicate equilibrium of the heat treatment system of the mixture of foodstuff 8. If, for example, this positioning were obtained by eliminating a certain number of these spires, the effect of this heat treatment would be considerably diminished, specifically in the most critical area of the cylinder, i.e. that corresponding to the discharge section of the product. On the other hand, the functionality of the sensor situated directly between the spires of the coil, would be inevitably jeopardized by the considerable heat gradient to which the same sensor would inevitably be subjected during the functioning of the machine.

This is the reason for the choice of the inventor, who housed the front sensor 9 on the body of the cylinder 1, fixing it in correspondence with its discharge section of the food, substantially coinciding with that of the engagement of the mentioned front ring 11, on the same cylinder 1. For this purpose, inside said area 10 of the mantle 4, there is a hole 20, suitable for receiving the front sensor 9, putting it in contact with the food collected inside cylinder 1 (FIG. 5).

In turn, an indent or front loop 14, suitable for containing the sensor 9 (FIG. 4), is included on the ring 11 area corresponding to the mentioned hole 20 of the cylinder 1. In this way, it is also possible to sustain the mentioned sensor 9 in a radial position, in correspondence with the area 10 of the cylinder 1, by supporting means such as the same collar seat 13, or a perforated stirrup, welded to the mantle 4 (not illustrated).

Figure 4:
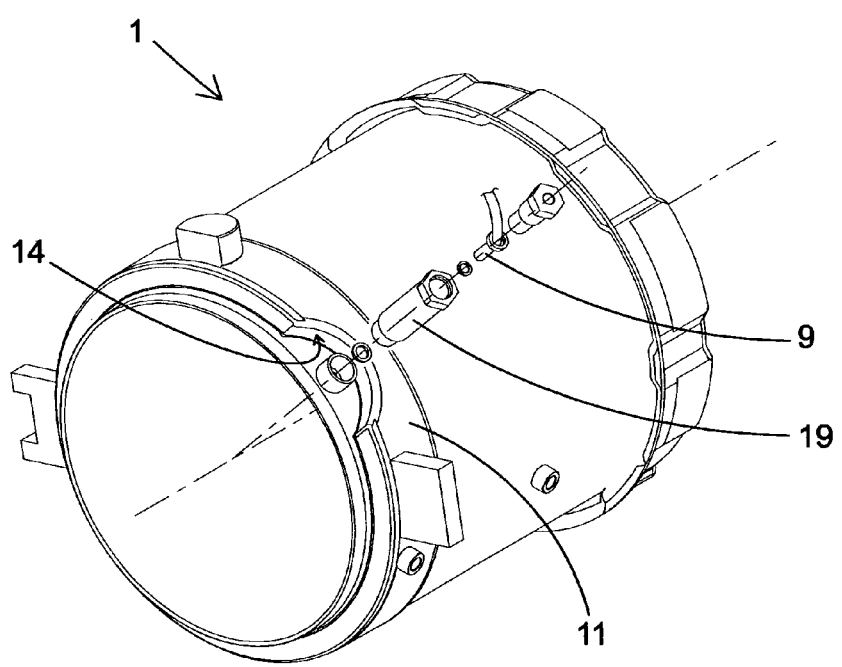
FIGS. 4 and 5 provide an axonometric illustration of the cylinder of the invention, with and without an external thermal insulator, respectively.
Figure 5:
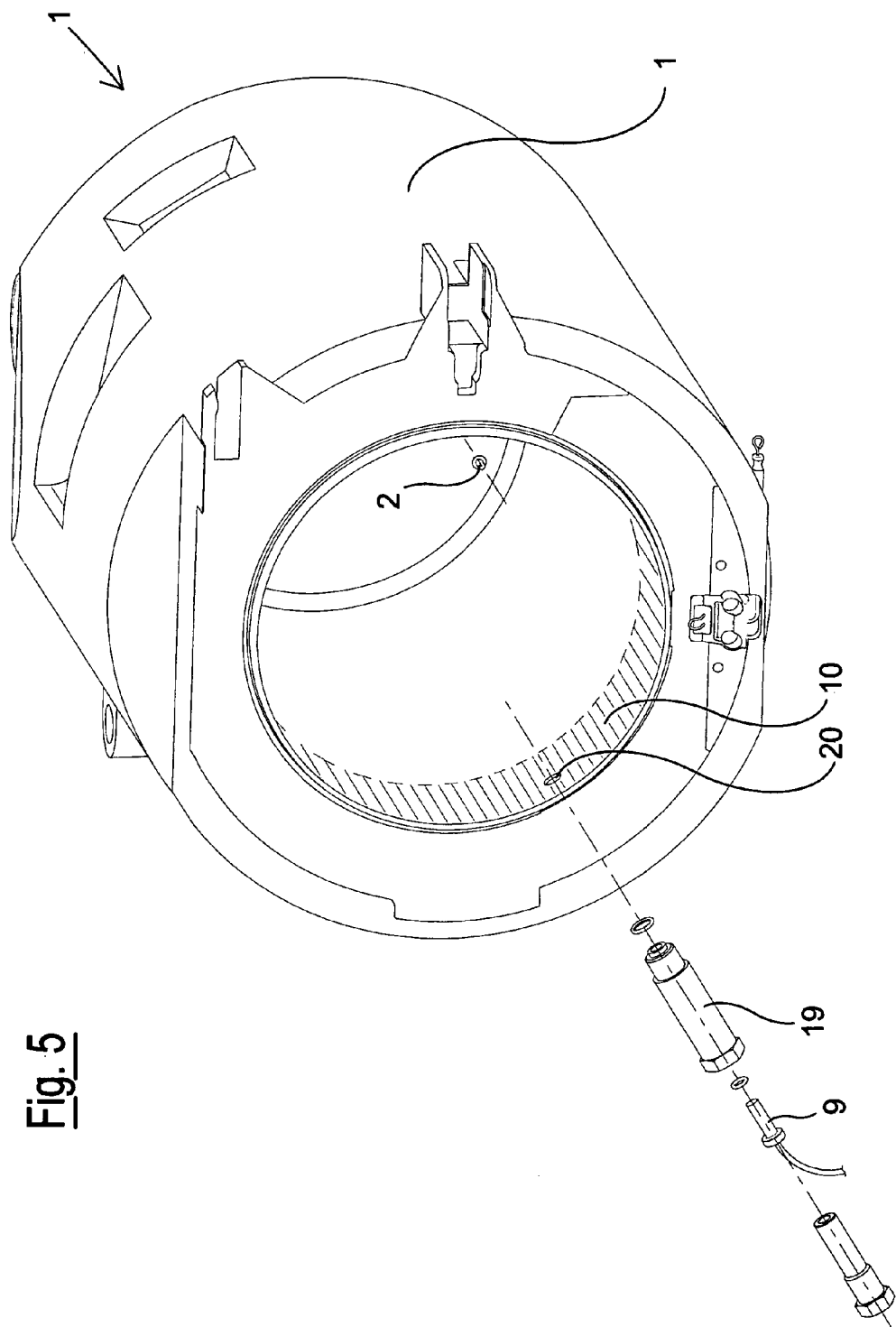

In any case, in order to guarantee the optimum heat insulation of the sensor 9 with respect to the coil 5, the same sensor is preferably protected by a hood 19 made of heat insulating material (FIGS. 4 and 5). Furthermore, as is better shown in FIG. 6, the above-mentioned front sensor 9 is arranged so as not to protrude inside the mantle 4, in order not to interfere with the rotating movement of the scraping teeth 12 of the mixer 6. For this purpose, the mentioned sensor 9 is housed in a collar seat 13 situated on the outer side of the mantle 4 itself (FIG. 6).

The above mentioned front sensor 9, moreover, is preferably positioned in a slightly lowered position with respect to the theoretical curved line TL of the mantle 4 of the cylinder 1 (advantageously in the order of about 0.1 mm in the central part of the hole 20; see FIG. 7a). In this way, the noninterference of the sensor 9 with the above mentioned teeth 12 is ensured, together with the correct reading of the heat value on the food being processed in the cylinder 1.

As shown in FIG. 7, the front flange 7 which closes the cylinder 1, comprises a hopper 16 for charging the ingredients, as an alternative or in addition to a rear duct 15 for feeding the product to be processed, and also an opening 17 for discharging the final product, controlled by a small shutter 18 (see also FIG. 6). The sensor 9 is advantageously positioned, as illustrated in FIG. 7, in a position close to the mentioned opening 17 for the discharge of the food from the cylinder 1, this position being included within the mentioned area 10 of the cylinder 1 (FIG. 3).

Again in the alternative embodiment illustrated in FIG. 7, the cylinder of the invention is equipped with both a rear temperature sensor 2 and a front temperature sensor 9.

When in use, the cylinder 1 can be fed with a quantity of food 8, for example through the mentioned duct 15, which terminates at the bottom of the same cylinder 1. This quantity can range between a full charge condition (corresponding to half of the theoretical capacity of said cylinder) and a partial charge condition (equivalent to less than a quarter of the theoretical capacity of the same cylinder D.

Figure 8:
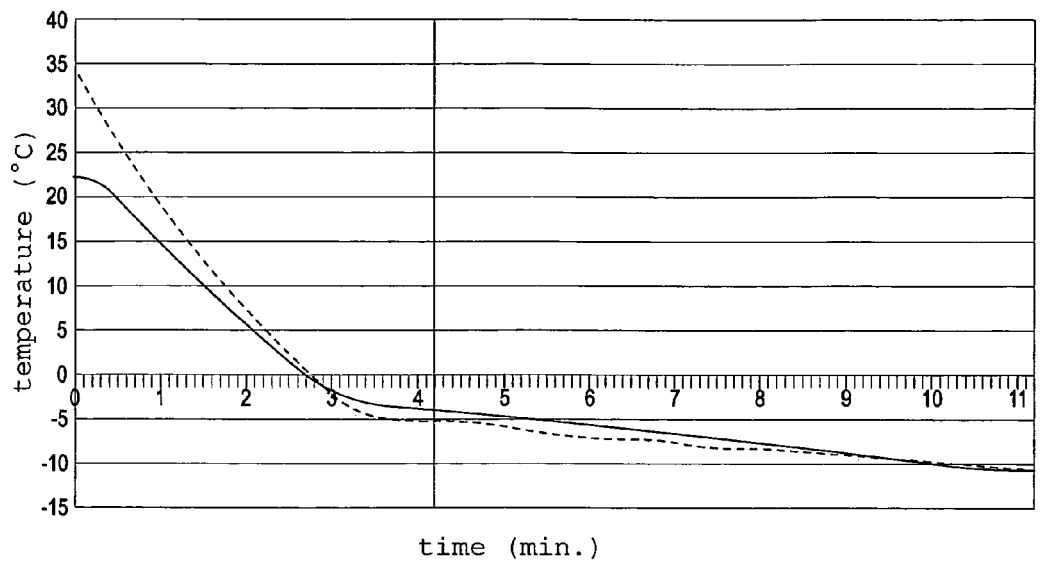
FIGS. 8 and 9 illustrate the temperature/time graphs of the food mass treated in the cylinder of FIG. 7, under full tank and partially empty tank conditions, respectively.

Under the full charge condition of the cylinder 1, both of the sensors 2 and 9 are in direct contact with the food mixture, i.e. they are fully immersed in the mixture of food during the whole operating cycle. Under this condition, the temperature value revealed by the sensors 2 and 9, are substantially overlapping. In the example illustrated, which is a mixture of milk-cream ice- cream, the temperature difference revealed by the sensors is minimum for temperatures lower than zero (FIG. 8).

Figure 9:
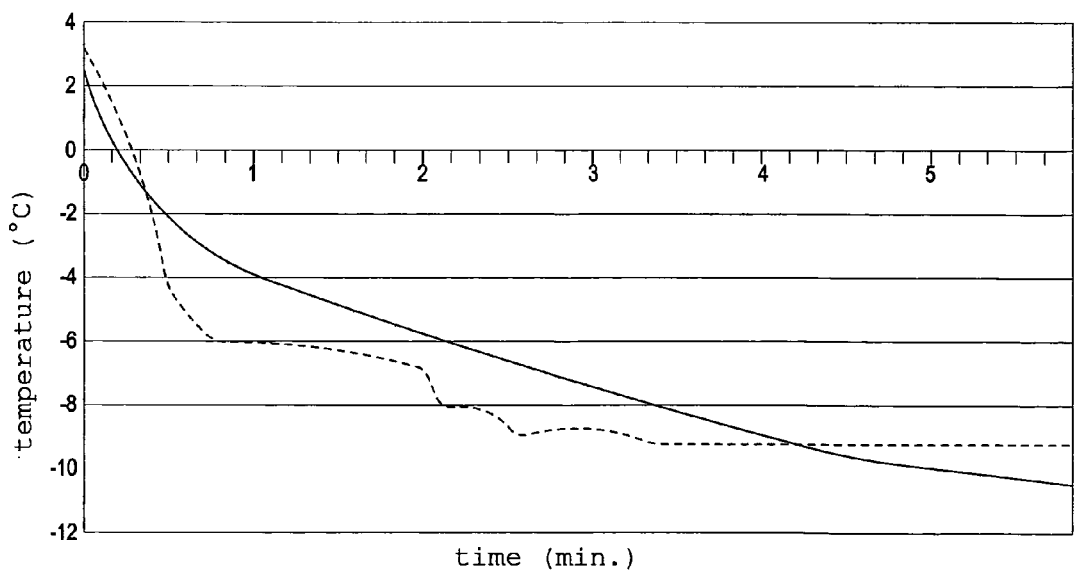

In the case, on the contrary, of the partial filling of the cylinder 1, the only sensor in contact with the food is the front sensor 9, as demonstrated by the temperature curves in FIG. 9. In particular, at temperatures lower than 0° C., the deviation between the temperature curves revealed by the sensors 2 and 9 is marked, whereas, under full cylinder conditions, this deviation is almost null.

Modifications can be applied to the invention as described above and illustrated in the enclosed sheets of drawings, for obtaining variations which in any case fall within the scope of the following claims. The number, type and positions of the mentioned sensors inside the cylinder 1, for example, can differ, the position of at least one of these on the front part of this cylinder, however, remaining unchanged.

The cylinder of the invention can also be advantageously applied to horizontal creamers and also to combined machines for the pasteurization and whipping of food mixtures (for example machines known on the market under the trade-name "Trittico" of the company Bravo Spa).

The invention claimed is:

1. A cylindrical tank for thermal treatment of a food product comprising:
    a heating or cooling system of said food product;
    a mixer housed in the heating or cooling system, so as to be axially revolving in an interior thereof;
    the tank comprising a cylindrical mantle closed by a rear bottom and a front flange;
    a feeding system feeding the food product inside the tank;
    at least one front sensor which measures the temperature of the food product, said front sensor being arranged in a recess defined in an area situated in a front part of the cylindrical mantle, the heating or cooling system being disposed outside of the recess, said front flange being equipped with an opening for discharging the finished food product, said front sensor being situated close to the opening;
    further comprising, in the recess, a hole suitable for receiving the front sensor and putting the front sensor in contact with the food product; and
    further comprising a front ring for closing the heating or cooling system on said cylindrical mantle, the recess being defined in the front ring, a seat being provided at the hole on the cylindrical mantle.

2. The tank according to claim 1, wherein said area is about 10 cm wide.

3. The tank according to claim 1, wherein said front sensor is positioned on the cylindrical mantle in a non-protruding position inside the tank.

4. The tank according to claim 3, wherein said front sensor is situated in a lowered position with respect to a theoretical curve line of said cylindrical mantle.

5. The tank according to claim 1, wherein said front sensor is supported on the cylindrical mantle with a collar seat.

6. The tank according to claim 5, wherein said front sensor is positioned radially with respect to the collar seat.

7. The tank according to claim 1, wherein said front sensor is equipped with a hood made from thermo-insulating material.

8. The tank according to claim 1, further comprising, in addition to the front sensor, a temperature sensor situated in a rear part of the tank.

9. The tank according to claim 1, wherein the front flange comprises a hopper for loading ingredients, as an alternative or in addition to a rear duct of the tank for feeding the food product to be processed, and wherein the opening for the discharge of the finished food product is controlled by a shutter.

10. A machine for production of food mixtures, comprising:
at least one tank according to claim 1.

* * * * *